Nov. 5, 1940.  A. R. THOMPSON  2,220,588
SCREW PUMP
Filed Jan. 10, 1939
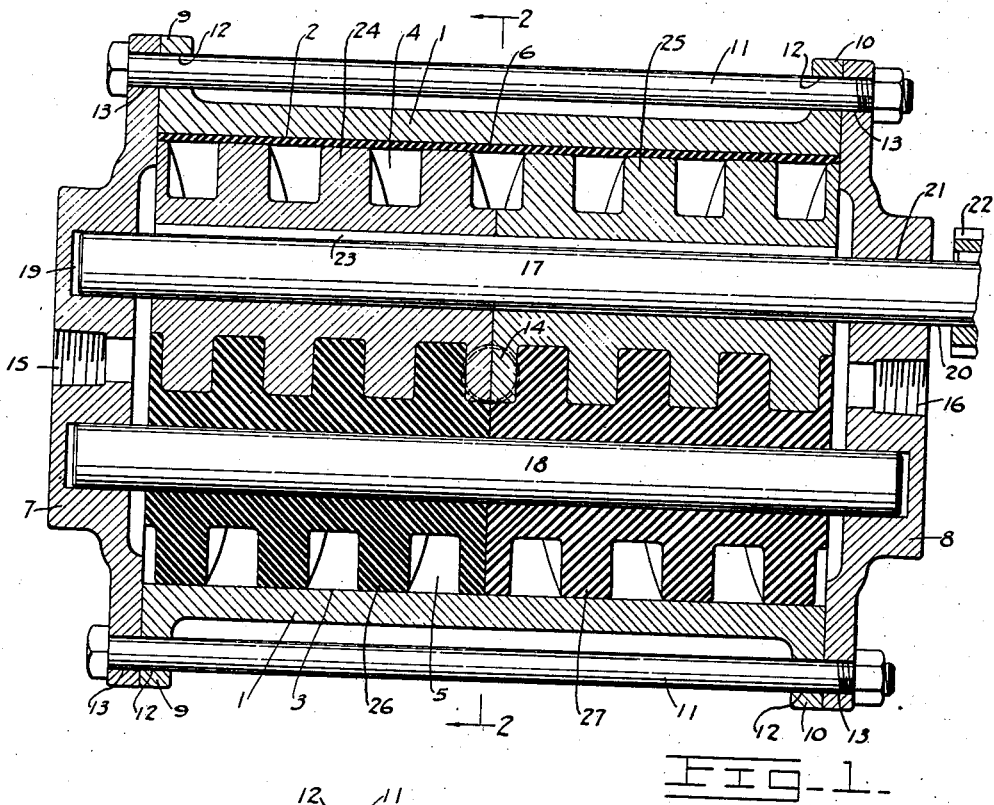
Fig-1-
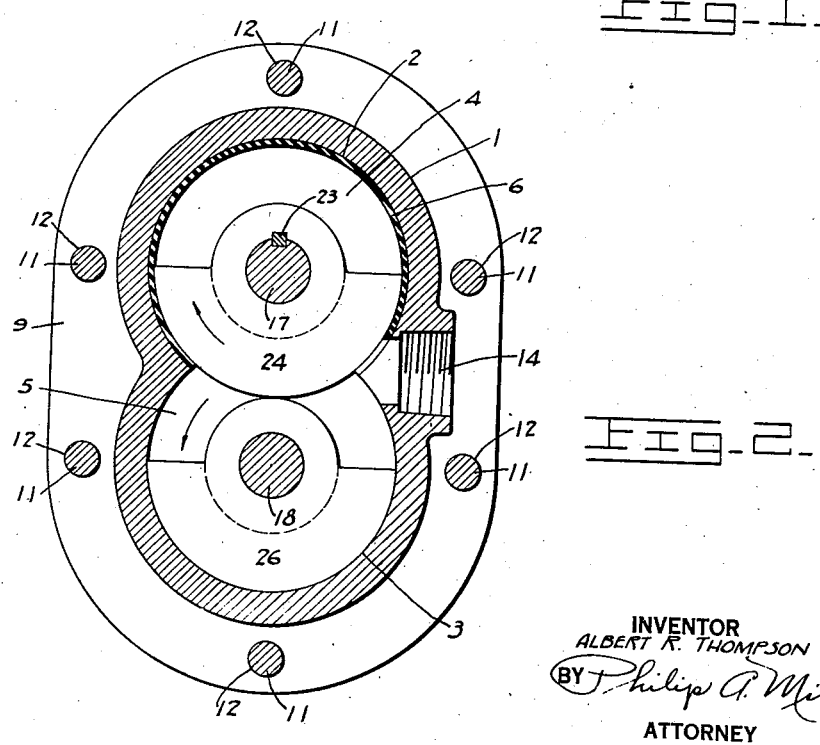
Fig-2-
INVENTOR
ALBERT R. THOMPSON
BY Philip A. Minnis
ATTORNEY Patented Nov. 5, 1940

2,220,588

UNITED STATES PATENT OFFICE 2,220,588

SCREW PUMP

Albert R. Thompson, Los Gatos, Calif., assignor to Food Machinery Corporation, San Jose, Calif., a corporation of Delaware Application January 10, 1939, Serial No. 250,118

3 Claims. (Cl. 103—128)

This invention relates to pumps and more particularly to that class known as screw pumps, which employ a plurality of intermeshing screws as impelling means for pumping liquids or semi-liquids.

It is an object of the invention to provide an improved screw pump which is simple in construction and arrangement of parts, efficient in operation, and particularly adapted for pumping liquids containing gritty or abrasive substances.

With this and other objects in view, the invention consists in the construction, operation, and novel combination and arrangement of parts described in detail in the following specification, illustrated in the accompanying drawing, and particularly pointed out in the claims hereto appended, it being understood, of course, that changes in the form, proportion, and minor details and arrangements of parts may be resorted to within the scope of the claims without distinguishing from the spirit of the invention or sacrificing any of the advantages thereof.

In the drawing:

Fig. 1 is a longitudinal section through a screw pump embodying features of the present invention.

Fig. 2 is a transverse section through the pump taken approximately on the line 2—2 of Fig. 1.

Referring now to the drawing, I designates the pump housing or casing which is preferably formed of metal such as cast iron or the like, and is constructed as a duplex cylinder comprising the intersecting bores 2 and 3, forming chambers 4 and 5.

The surface or wall of the bore 2 is lined with a tough but resilient substance 6, such as rubber or the like, which may be molded and vulcanized thereon or which may be attached thereto in the form of a snugly fitting sleeve. The surface of the other bore 3, however, is not lined.

The ends of the casing I are closed by cylinder heads 7 and 8 secured to annular flanges 9 and 10 of the housing by tie rods or bolts 11 extending through registering holes 12 and 13 in the flanges and cylinder heads respectively. The housing I is further provided with a screw-threaded opening 14 positioned midway between the respective ends thereof and at a line of intersection of the chambers 4 and 5 for attachment of a fluid discharge conduit thereto, while threaded openings 15 and 16 centrally arranged within the cylinder heads 7 and 8 respectively are provided for attachment of fluid inlet conduits at both ends of the casing I.

Centrally positioned within the chambers 4 and 5 of the housing I and longitudinally extending through the same are parallel shafts 17 and 18. The shaft 17 is rotatably mounted with one of its ends in a bearing portion 19 of the cylinder head 7, while the other end 20 of the same is supported in a bearing 21 in the cylinder head 8. The end 20 of shaft 17 extends through the cylinder head 8 and carries a gear 22 keyed thereto and adapted to be driven in any convenient manner.

Mounted within the chamber 4 and secured to shaft 17 for rotation therewith by means of a key 23 are oppositely convoluted metal screws or fluid impelling members 24 and 25. The outer edges of the threads of these impelling members are in close fitting engagement with the surface of the bore 2, which is of a resilient substance as already referred to above.

In a similar manner a shaft 18 is provided with oppositely convoluted screws or impellers 26 and 27 of a resilient but tough material such as rubber or the like, which are positioned within the chamber 5 with the outer surface of their threads in closely fitted relation with respect to the metallic surface of the bore 3. The screws 24 to 27, inclusive, which are adapted to convey fluid through the pump chambers toward the center of the same, are so arranged with respect to each other that the threads of opposing oppositely convoluted screws 24, 26 and 25, 27 engage at the place of intersection of the chambers 4 and 5 so that the threads of one screw project close to the bottom of the spaces between the threads of the opposite screw, while the sides of the threads of the screws or impellers are in close contact where they intermesh. In this way, the spaces between the threads of each impeller member are divided into separate compartments between each complete convolution of the threads.

It will therefore be seen that upon rotation of the shaft 17 and the impellers 24 and 25 in one direction, the impellers 26, 27 and shaft 18 will be correspondingly rotated in the opposite direction, by reason of the cooperative engagement between the opposing and oppositely convoluted screws or impeller members. Dependent upon the direction of rotation of the shaft 17, whether in a counter-clockwise or clockwise direction, and the direction of convolution of the threads of the opposing impeller members, fluid entering the compartments formed by the threads of opposing impellers, due to the suction created, will be advanced through the pump chambers from the inlet openings 15 and 16 to the discharge opening 14, or vice versa.

From the above, it will be apparent that gritty or abrasive particles entering between contacting surfaces of the screw or impeller members or entering between the contacting surfaces of the impellers and the housing will cause no damage to the relatively movable parts of the pump, as always one of the contacting surfaces thereof is made from resilient material which will flex or yield to permit the passage of such particles through the pump housing and impellers without harmful abrasive effects thereon.

Furthermore, in view of the fact that only one of relative movable parts of the impeller and housing structure is made from resilient material and the other of such parts is formed from a metallic substance, any tendency to jam or undue friction between relatively moving parts is entirely eliminated.

Having thus described my invention, what I claim and desire to protect by Letters Patent is:

1. A pump for displacement of liquids comprising a housing containing two parallel intersecting cylinders, one of said cylinders having a metallic inner surface and the other having an elastic, deformable inner surface, a pair of oppositely threaded screw members rotatably mounted in said cylinders and intermeshing together through the intersection between the cylinders, one of said screws having an elastic, deformable surface and mounted in the metal cylinder, and the other of said screws having a rigid surface and mounted in the elastic deformable cylinder, inlet and outlet ports for the liquid, and means for driving the screws.

2. A pump comprising a housing having intersecting chambers, the interior surface of one of said chambers being formed of elastic, rubber-like material and the interior surface of the other of said chambers being formed of rigid material, a rotary screw-threaded impeller of rigid material within said first mentioned chamber and in close contact with the elastic, rubber-like surface thereof, and another rotary impeller of elastic, rubber-like material having screw threads of opposite convolution to that of said first mentioned impeller and intermeshing therewith, said elastic, rubber-like impeller being arranged within the other of said chambers in close contact with the rigid surface thereof.

3. A pump for displacement of liquids containing abrasive or gritty substances comprising a housing provided with a plurality of intersecting compartments, the interior surface of one of said compartments being formed of rubber, or rubber-like material and the interior surface of the other of said compartments being formed of rigid material, a pair of aligned oppositely convoluted rotary impeller screws of rigid material within said first mentioned compartment and in close contact with the rubber, or rubber-like surface thereof, and a pair of aligned rotary impeller screws of rubber, or rubber-like material having screw threads of opposite convolutions to those of said first mentioned impeller screws and intermeshing therewith, said last mentioned impeller screws being arranged within the other of said compartments in close contact with the metallic surface thereof, said housing being provided with ports for the intake and discharge of liquid, one of said ports being located adjacent each of the outer ends of said impellers and another of said ports being located adjacent the inner ends of the impellers.

ALBERT R. THOMPSON.